US009901944B2

(12) United States Patent
Ryon et al.

(10) Patent No.: US 9,901,944 B2
(45) Date of Patent: Feb. 27, 2018

(54) ATOMIZERS

(71) Applicant: Delavan Inc, West Des Moines, IA (US)

(72) Inventors: Jason A. Ryon, Carlisle, IA (US); Philip E. Buelow, West Des Moines, IA (US); Steven L. Smith, West Des Moines, IA (US); Lev A. Prociw, Johnston, IA (US)

(73) Assignee: DELAVAN INC, West Des Moines, IA (US)

( * ) Notice: Subject to any disclaimer, the term of this patent is extended or adjusted under 35 U.S.C. 154(b) by 0 days.

(21) Appl. No.: 15/044,814

(22) Filed: Feb. 16, 2016

(65) Prior Publication Data

US 2016/0236215 A1 Aug. 18, 2016

Related U.S. Application Data

(60) Provisional application No. 62/117,814, filed on Feb. 18, 2015, provisional application No. 62/117,778, filed on Feb. 18, 2015.

(51) Int. Cl.
*B05B 1/28* (2006.01)
*B05B 7/10* (2006.01)
*F23R 3/28* (2006.01)
*F23R 3/14* (2006.01)
*F02C 7/232* (2006.01)
(Continued)

(52) U.S. Cl.
CPC ............... *B05B 7/10* (2013.01); *F02C 7/232* (2013.01); *F23D 11/107* (2013.01); *F23R 3/04* (2013.01); *F23R 3/14* (2013.01); *F23R 3/286* (2013.01); *F05D 2220/32* (2013.01)

(58) Field of Classification Search
CPC .......... B05B 7/10; F02C 7/232; F23D 11/107; F23R 3/04; F23R 3/14; F23R 3/286; F23R 3/06; F23R 3/26; F23R 3/42; F23R 3/46
USPC ..................................... 239/290; 60/732-748
See application file for complete search history.

(56) References Cited

U.S. PATENT DOCUMENTS 4,141,505 A  2/1979  Reich
5,579,645 A * 12/1996  Prociw .................. F23D 11/107
                                                                       239/404

(Continued)

OTHER PUBLICATIONS

Extended European Search Report issued in corresponding European Patent Application No. EP 16156363.0, dated Oct. 11, 2016.

(Continued)

*Primary Examiner* — Arthur O Hall
*Assistant Examiner* — Adam J Rogers
(74) *Attorney, Agent, or Firm* — Locke Lord LLP; Scott D. Wofsy; Joshua L. Jones

(57) ABSTRACT

An atomizer includes an atomizer body with a plurality of air passages defined therethrough from an upstream end of the atomizer body to a downstream end thereof. The air passages together define an air circuit through the atomizer body. A fuel circuit is defined in the atomizer body extending from a fuel inlet to a respective fuel outlet opening into each air passage. The air passages can be arranged circumferentially about a central axis defined by the atomizer body. The fuel circuit can include a manifold extending circumferentially about the atomizer body in fluid communication with a fuel opening in each respective air passage.

14 Claims, 7 Drawing Sheets

(51) Int. Cl.
*F23R 3/04* (2006.01)
*F23D 11/10* (2006.01)

(56) References Cited

U.S. PATENT DOCUMENTS

| | | | | |
|---|---|---|---|---|
| 5,697,553 | A * | 12/1997 | Stotts | B05B 1/3442 |
| | | | | 239/406 |
| 6,311,473 | B1 * | 11/2001 | Benjamin | F23C 7/002 |
| | | | | 239/402 |
| 6,755,024 | B1 | 6/2004 | Mao et al. | |
| 8,171,734 | B2 * | 5/2012 | McMasters | B23P 6/007 |
| | | | | 60/748 |
| 2004/0061001 | A1 * | 4/2004 | Mao | B05B 7/08 |
| | | | | 239/398 |
| 2005/0279862 | A1 * | 12/2005 | Mao | F23D 11/107 |
| | | | | 239/403 |
| 2009/0197214 | A1 * | 8/2009 | Bretz | B05B 7/066 |
| | | | | 431/159 |
| 2011/0265482 | A1 * | 11/2011 | Parsania | F23R 3/286 |
| | | | | 60/740 |
| 2012/0047903 | A1 * | 3/2012 | Williams | F02C 7/22 |
| | | | | 60/746 |
| 2014/0166143 | A1 | 6/2014 | Buelow et al. | |
| 2014/0291418 | A1 * | 10/2014 | Ruffing | F23R 3/14 |
| | | | | 239/403 |
| 2014/0338337 | A1 | 11/2014 | Prociw et al. | |
| 2015/0108236 | A1 * | 4/2015 | Buelow | F01N 3/0253 |
| | | | | 239/5 |

OTHER PUBLICATIONS

Partial European Search Report from European Patent Office dated Jun. 23, 2016 for Application No. EP 16156363.
Partial European Search Report from European Patent Office Report dated Jun. 23, 2016 for Application No. EP 16156363.

* cited by examiner

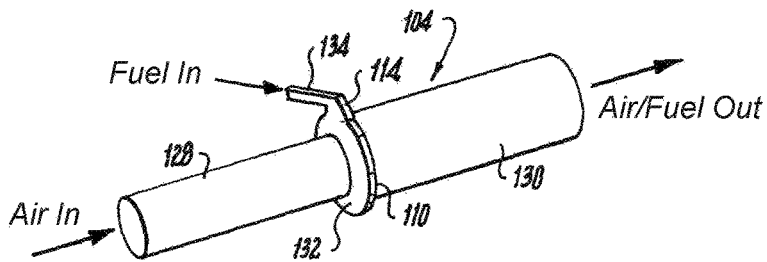
Fig. 3
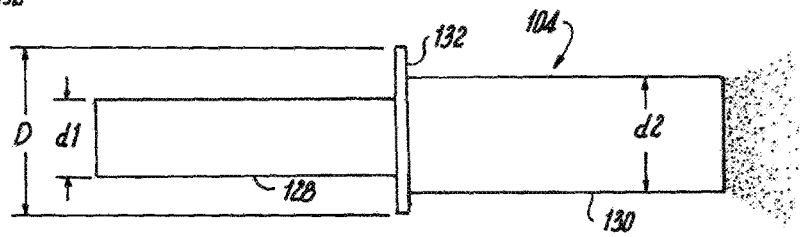
Fig. 4
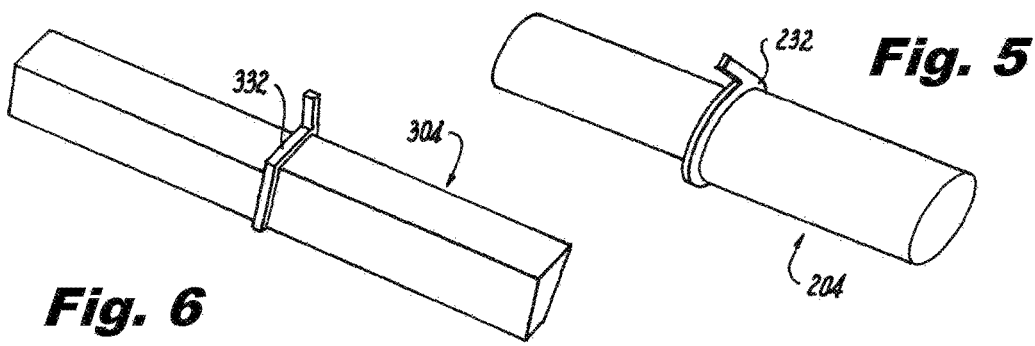
Fig. 5
Fig. 6
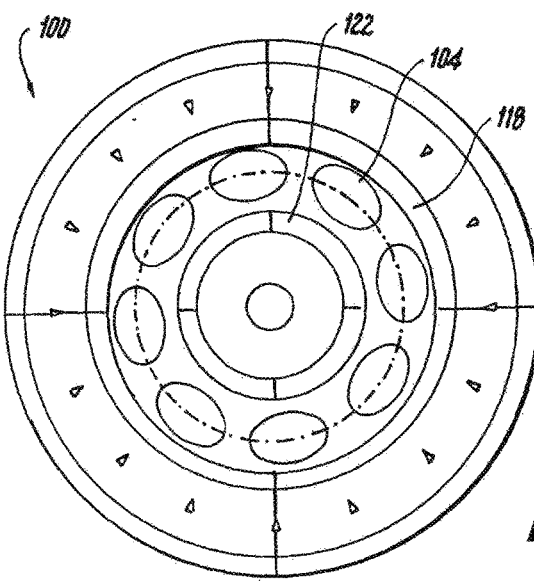
Fig. 7

ATOMIZERS

CROSS-REFERENCE TO RELATED APPLICATION

This application claims the benefit of priority under 35 U.S.C. § 119(e) to U.S. Provisional Application No. 62/117,814, filed Feb. 18, 2015, and Provisional Application No. 62/117,778, filed Feb. 18, 2015, each of which is incorporated herein by reference in its entirety.

BACKGROUND OF THE INVENTION

1. Field of the Invention

The present disclosure relates to atomizing nozzles, injectors, and the like, and more particularly to atomizers such as used in fuel injectors for gas turbine engines.

2. Description of Related Art

A variety of devices and methods are known in the art for atomizing liquids. Of such devices, many are directed to atomizing liquid fuel into a fine spray for combustion such as in gas turbine engines. The ability to adequately atomize liquid fuel is a key aspect of clean, efficient combustion.

Traditional prefilming airblast style fuel injectors have a fuel circuit which injects fuel at least partially tangentially along a cylindrical prefilming surface. The film of fuel created along this surface is then subjected to a relatively higher velocity air sheet which atomizes and transports the fuel into the combustor in a manner that provides a consistent spray angle and patternation characteristics as required by the combustion system. The maximum surface area of the sheet of fuel is proportional to the circumference of the prefilmer if a full fuel sheet is obtained (and less if a full film is not achieved). A significant percentage of the air flowing through a typical airblast nozzle does not directly interact with the fuel during the atomization process. Only the air flowing near the fuel prefilmer and the initial fuel sheet directly affects atomization. The majority of the nozzle air flow is involved only in subsequent combustion processes, or as extra mass to mix with post-combustion exhaust products to lower the flame temperature as a means of reducing NOx emissions.

Such systems and methods have been considered satisfactory for their intended purpose. However, the development of ever more efficient and advanced engines and components drives an ongoing need for improved atomization. The present disclosure provides a solution for this need.

SUMMARY OF THE INVENTION

An atomizer includes an atomizer body with an air passage defined therethrough from an upstream end of the atomizer body to a downstream end thereof. A fuel circuit is defined in the atomizer body extending from a fuel inlet to a fuel outlet opening into the air passage.

The fuel circuit can open tangentially into the air passage relative to a flow path defined through the air passage. For example, the fuel circuit can include a swirl channel extending circumferentially around the air passage, with a fuel slot opening tangentially into the swirl channel.

The air passage can have an inlet portion upstream of where the fuel circuit opens into the air passage, and an outlet portion downstream of where the fuel circuit opens into the air passage. The inlet portion can have a smaller cross-sectional flow area than that of the outlet portion. The air passage can have an inlet portion extending in a first direction and an outlet portion extending in a second direction angled relative to the first direction for imparting a flow with at least one of a tangential, converging, or diverging component relative to central axis defined by the atomizer body. An air swirler can be mounted in the air passage to impart swirl within the air passage.

The fuel circuit can include a swirl channel extending circumferentially around the air passage, wherein the swirl channel has a greater cross-sectional depth relative to a flow path defined through the air passage than that of the air passage upstream and downstream of the swirl channel. It is contemplated that the air passage can have a cross-sectional shape including circular, trapezoidal, elliptical, or any other suitable shape, including converging and/or diverging geometries. The fuel circuit can include a swirl channel extending circumferentially around the air passage, wherein the swirl channel has a shape conforming to the cross-sectional shape of the air passage.

In certain embodiments, the air passage is defined between a pair of axial swirl vanes. The fuel circuit includes a fuel manifold inboard or outboard of the swirl vanes, with a respective fuel outlet opening along at least one of the vanes radially from the fuel manifold.

In another aspect, the atomizer body can include a plurality of air passages, as described above. The air passages together can define an air circuit through the atomizer body. The fuel circuit can extend from the fuel inlet to a respective fuel outlet opening into each of the air passages respectively. The air passages can be arranged circumferentially about a central axis defined by the atomizer body. The fuel circuit can include a manifold extending circumferentially about the atomizer body in fluid communication with a fuel opening in each respective air passage. An outer air swirler can be defined through the atomizer body outboard of and surrounding the air passages and fuel circuit. An inner air swirler can be defined through the atomizer body inboard of and surrounded by the air passages and fuel circuit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a schematic perspective view of a portion of the atomizer of FIG. 1, showing one of the air passages and a portion of the fuel circuit;

FIG. 4 is a cross-sectional schematic view of the portion of the atomizer of FIG. 3, showing the inside of the fuel swirler;

FIGS. 5 and 6 are schematic perspective views of exemplary embodiments of air passages and fuel circuits with elliptical and trapezoidal cross-sectional shapes, respectively;

FIG. 7 is a schematic outlet end view of the atomizer of FIG. 1, for comparing the effective cross-sectional area of a traditional prefilmer with the effective cross-sectional area of an atomizer as disclosed herein;

DETAILED DESCRIPTION OF THE PREFERRED EMBODIMENTS

Figure 1:
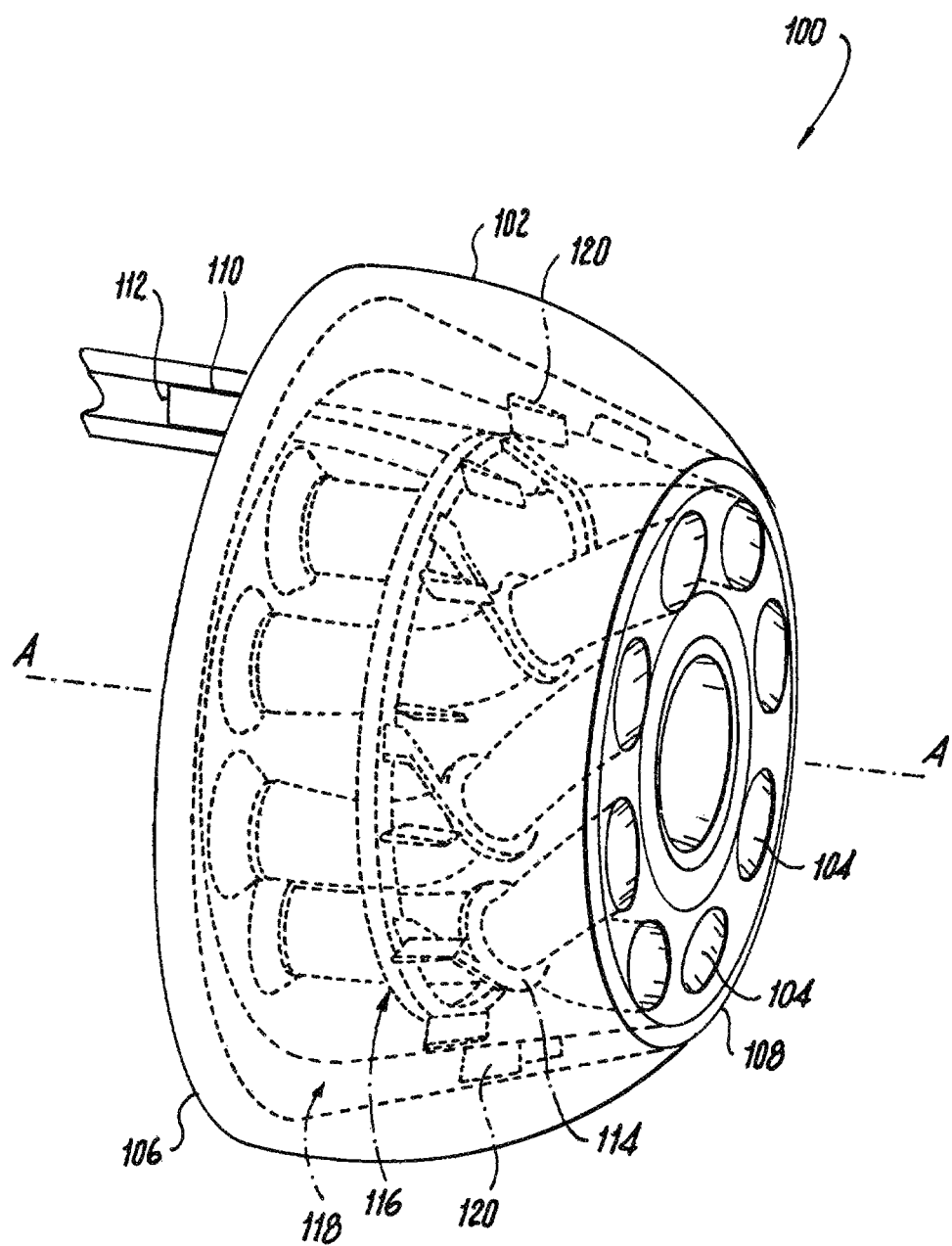
FIG. 1 is a cut away perspective view of an exemplary embodiment of an atomizer constructed in accordance with the present disclosure, showing the air and fuel circuits.

Reference will now be made to the drawings wherein like reference numerals identify similar structural features or aspects of the subject disclosure. For purposes of explanation and illustration, and not limitation, a partial view of an exemplary embodiment of an atomizer in accordance with the disclosure is shown in FIG. 1 and is designated generally by reference character 100. Other embodiments of atomizers in accordance with the disclosure, or aspects thereof, are provided in FIGS. 2-16, as will be described. The systems and methods described herein can be used to atomize liquids, such as in atomizing fuel for combustion in a gas turbine engine.

Atomizer 100 includes an atomizer body 102 with a plurality of air passages 104 defined therethrough from an upstream end 106 of atomizer body 102 to a downstream end 108 thereof. The air passages 104 together define an air circuit through atomizer body 102. A fuel circuit 110 is defined in atomizer body 102, extending from a fuel inlet 112 to a respective fuel outlet 114 opening into each of the air passages 104 respectively.

Figure 2:
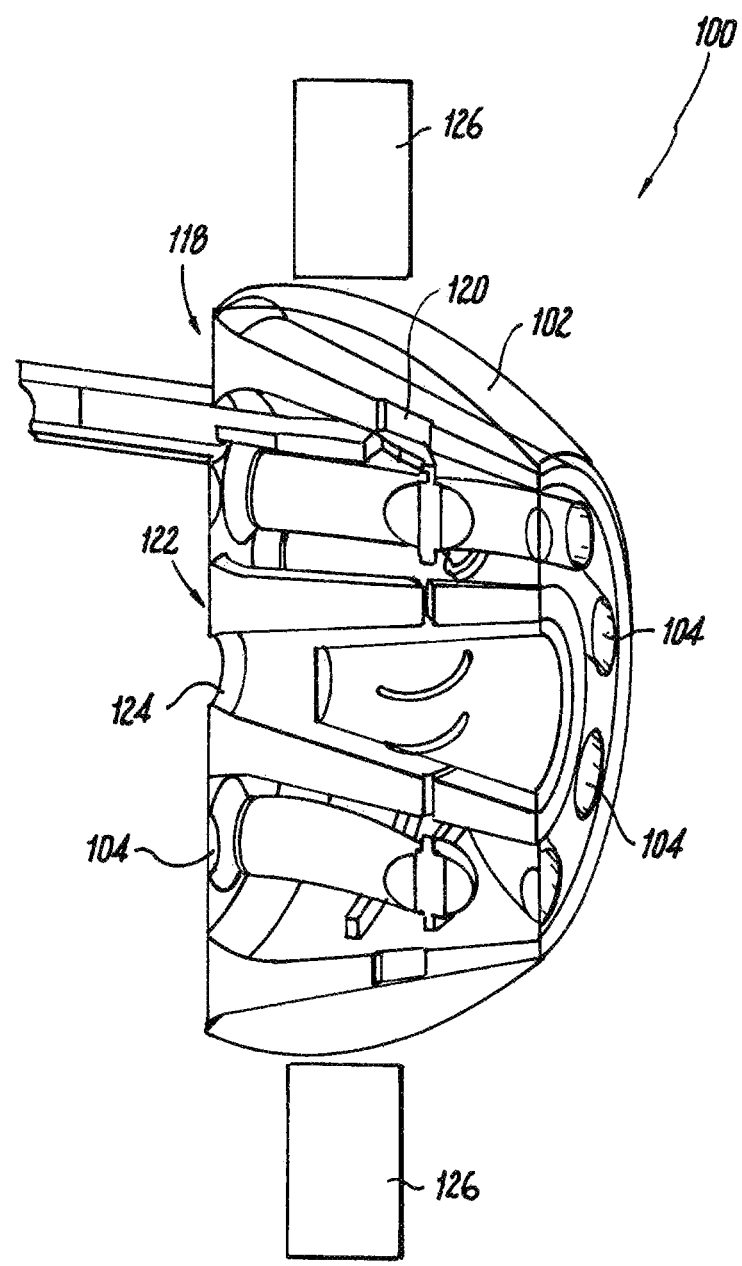
FIG. 2 is a schematic cross-sectional perspective view of the atomizer of FIG. 1, showing the inner and outer air swirlers.

The air passages 104 are arranged circumferentially about a central axis A defined by the atomizer body. Fuel circuit 110 includes a fuel gallery or manifold 116 extending circumferentially about atomizer body 102 in fluid communication with the volute of fuel opening 114 in each respective air passage 104 for distribution of fuel to each air passage 104. As shown in FIG. 2, an outer air swirler 118 including axial vanes 120 is defined through atomizer body 102 outboard of and surrounding the air passages 104 and fuel circuit 110. An inner air swirler 122 including axial vanes 124 is defined through atomizer body 102 inboard of and surrounded by the air passages 104 and fuel circuit 110. Atomizer body 102 is configured to be operatively connected to a combustor liner or dome 126 as part of a fuel injection system, e.g., in a gas turbine engine With reference now to FIG. 3, each air passage 104 has an inlet portion 128 upstream of where the fuel circuit 110 opens into air passage 104, and an outlet portion 130 downstream of where the fuel circuit 110 opens into air passage 104. The fuel circuit 110 opens into air passage 104 about half way between the inlet and outlet of air passage 104. However, this can vary as needed from an application to application basis, with 50% to 90% generally providing suitable results. Any suitable injection location can be used.

As shown in FIG. 1, the bell-mouth entrance geometry of air passage 104 is configured to reduce separations throughout air passage 104, however, any other suitable entrance geometry can be used. U.S. patent application Ser. No. 13/714,270, which is incorporated by reference herein in its entirety, teaches exemplary entrance geometries.

The inlet portion 128 has a smaller cross-sectional flow area, e.g., diameter, than that of outlet portion 130. The relative diameters can also be seen in FIG. 4. The fuel circuit 110 includes a swirl channel 132 extending circumferentially around air passage 104. As shown in FIG. 4, swirl channel 132 has a greater cross-sectional depth, e.g., diameter D, relative to the flow path defined through air passage 104 than that of the air passage 104 upstream, i.e. diameter d1, and downstream, i.e., diameter d2, of swirl channel 132. This change in diameter defines a downstream backstep to ensure proper fuel distribution around the perimeter of the outlet portion 130 while reducing the propensity of fuel to backflow upstream into the inlet portion 128 of the air passage 104 during operation. FIG. 3 schematically shows air passage 104 and fuel circuit 110 as solid forms; however this is for schematic clarity. Air passage 104 and fuel circuit 110 are in fact voids through which fluids can pass.

Moreover, air passage 104 is shown in FIGS. 3 and 4 as being straight, again for schematic clarity. However, as shown in FIG. 1, each air passage 104 has an inlet portion 128 extending in a first direction and an outlet portion 130 extending in a second direction angled relative to the first direction for imparting a flow with a tangential, converging component relative to central axis A defined by atomizer body 120. This gives an overall swirl to the air/fuel mixture issuing from atomizer 100. Those skilled in the art will readily appreciate that air passages can be straight as shown in FIGS. 3-4, or bent as shown in FIG. 1 as needed based on application to provide a tangential, converging, and/or diverging flow component.

With reference again to FIG. 3, fuel circuit 110 opens tangentially into air passage 104 relative to the flow path defined through air passage 104. Fuel circuit 110 includes a fuel slot 134 that opens tangentially into swirl channel 132, which extends circumferentially around air passage 104. Fuel introduced through fuel slot 134 spins circumferentially around swirl channel 132 and it films along the surface of outlet portion 130 of air passage 104. The air meets with the fuel and the shear forces between the air and fuel increase the liquid film velocity, forming ligaments which further form into droplets. The fuel and air exit the air passage 104 into the combustor, in a gas turbine engine for example, where it can meet with additional air streams and continue to atomize. The area downstream of where the fuel is injected is larger than the area of the air-only inlet portion 128 to accommodate the fuel and air without the fuel tending to backflow up into the air circuit.

In this manner, air enters inlet portion 128, fuel enters through fuel slot 134, and a fuel/air mixture is issued from outlet portion 130 of air passage 104. Slots 134 are sized to meter the proper amount of fuel to each air passage 104. Any other suitable structure for introducing fuel into air passages can be used in addition to or in lieu of fuel slot 134 and swirl channel 132 without departing from the scope of this disclosure.

With reference now to FIGS. 4 and 5, it is contemplated that the air passage can have a cross-sectional shape including circular, as shown in FIG. 3, or can have a trapezoidal cross sectional shape as in air passage 204 of FIG. 5, an elliptical cross-sectional shape as in air passage 304 of FIG. 6, or can have any other suitable shape. The fuel circuit can include a swirl channel extending circumferentially around the air passage, wherein the swirl channel has a shape conforming to the cross-sectional shape of the air passage, as in swirl channels 232 and 332 shown in FIGS. 5 and 6, respectively.

With reference now to FIG. 7, atomizers in accordance with this disclosure provide greater effective cross-sectional area for atomization than to traditional atomizers. FIG. 7 shows a schematic outlet end view of atomizer 100 with the effective cross-sectional area for atomization indicated with dashed lines. The cross-sectional area for a traditional prefilming atomizer of similar size to atomizer 100 is indicated with the dotted line in FIG. 7.

The effective cross sectional area of a traditional prefilmer is defined by a film thickness multiplied by the circumference of the single prefilming surface. The effective cross-sectional area of atomizer 100 is also the circumference of the air atomizing circuit exits multiplied by the film thickness. Since the total sum of air passage 104 circumferences of atomizer 100 is about 2-4 times (or greater) compared to the circumference of the traditional configuration, atomizer 100 has have a proportionally thinner film for the same mass flow rate. The thinner film leads to smaller atomized droplets, meaning more complete and effective atomization. Additionally, smaller droplets expose the fuel to a larger fraction of the air flowing through a nozzle. This decreases the fuel/air ratio at the point where the air/fuel mixture is injected into the combustion chamber, relative to traditional configurations. Atomizers as disclosed herein use a greater percentage of the nozzle air flow in the atomization process. This more efficiently transfers the kinetic energy of the air flow into the physical processes of atomization, with the purpose of driving droplet size smaller. Additionally, mixing the fuel with a larger percentage of nozzle air flow inside the nozzle reduces the stoichiometric zones that would otherwise burn at high temperatures, thereby reducing thermal NOx emissions produced by the Zeldovich mechanism.

Figure 8:
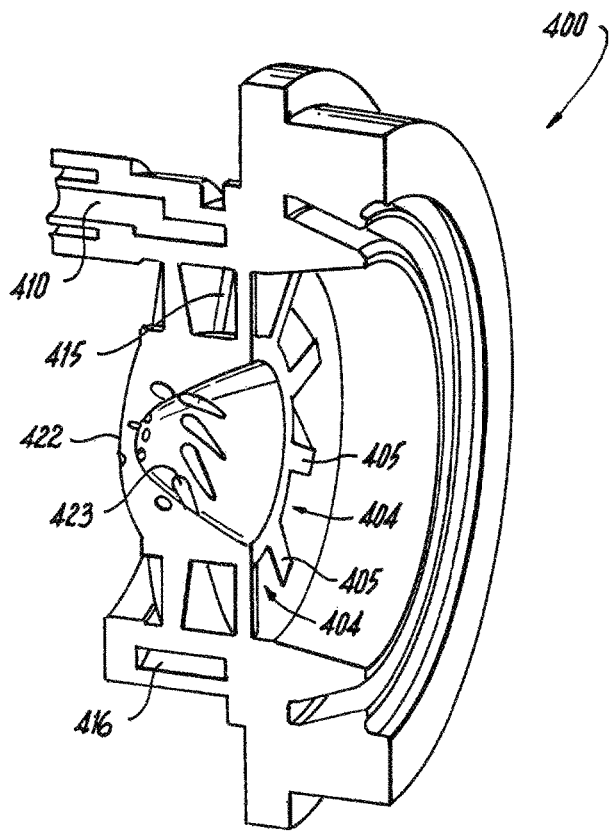
FIG. 8 is a cross-sectional perspective view of another exemplary embodiment of an atomizer in accordance with the present disclosure, showing the fuel circuit opening into air passages between vanes.
Figure 9:
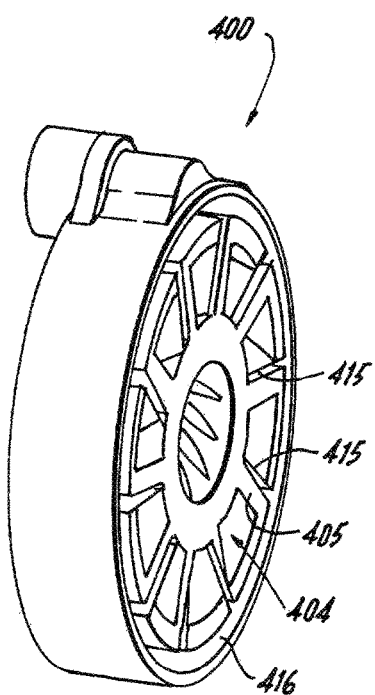
FIG. 9 is a cross-sectional perspective view of the atomizer of FIG. 8, showing the cross-section identified in FIG. 8.

With reference now to FIG. 8, another exemplary embodiment of atomizer is shown, namely atomizer 400. In atomizer 400, each air passage 404 is defined between a pair of axial swirl vanes 405. Air passages 404 are swept helical cuts with a trapezoidal profile. The fuel circuit 410 includes a fuel manifold 416 outboard of the swirl vanes 405. A respective fuel outlet 415 opens along each of the vanes 405 radially inward from the fuel manifold 410, however it is also contemplated that the fuel manifold could be on the inner diameter with fuel outlets opening radially outward. The fuel can progress down the surface of each vane 405 and can wrap around the air passages 404 to form a thin film and thereafter into atomized droplets of fuel. The fuel injection location can be located along either side (pressure side or suction side) surfaces of the air passages, depending on the desired outcome in a given application.

The fuel passages and downstream backstep described above are not shown in FIGS. 8 and 9 for simplicity, but it is envisioned that these features can be incorporated into the air passages 404 and fuel circuit 410 of atomizer 400 without departing from the scope of this disclosure. Moreover, those skilled in the art will readily appreciate that the systems and methods described herein can be used with any suitable geometry—including aerodynamic profiled vanes and fully three dimensional air passages. Inner air swirler 422 includes swirler ports 423 much as described in U.S. patent application Ser. No. 13/665,497, which is incorporated by reference herein in its entirety. Any other suitable type of swirler can be used. For instance, the air passages need not be swept helical cuts. They could be of any suitable geometric shape, such as aerodynamic and/or extruded shapes with or without a twist. A beneficial aspect can be realized by having a fuel outlet along the vane in a generally radial direction.

Figure 10:
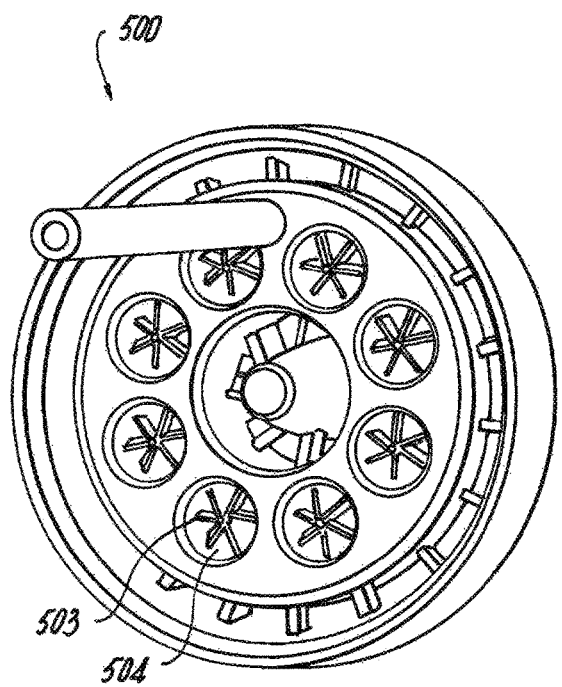
FIG. 10 is an upstream perspective view of another exemplary embodiment of an atomizer in accordance with the present disclosure, showing a respective air swirler in each of the air passages.
Figure 11:
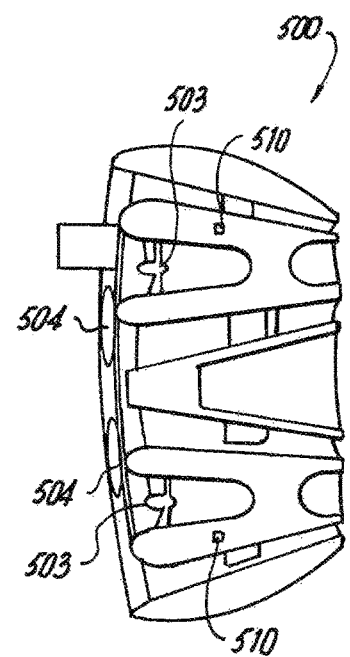
FIG. 11 is a cross-sectional perspective view of the atomizer of FIG. 10, showing two of the air passage air swirlers.
Figure 12:
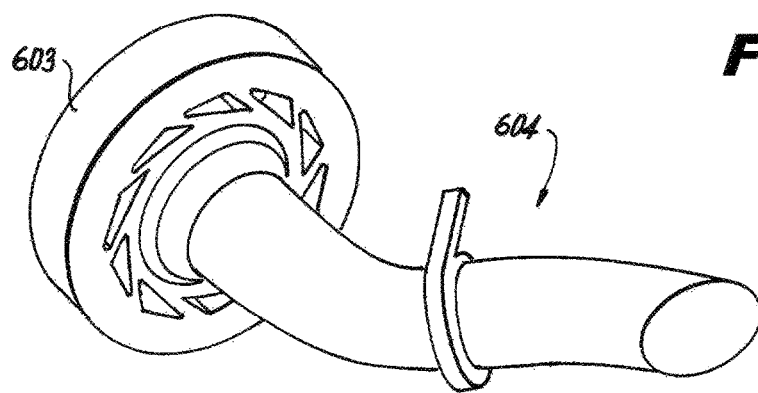
FIG. 12 is a schematic perspective view of an exemplary embodiment of an air passage, showing a radial air passage swirler.

With reference now to FIG. 10, atomizer 500 is shown, in which a respective air swirler 503 is mounted in each air passage 504 to impart swirl within the air passage 504. As shown in FIG. 11, swirlers 503 are positioned upstream of where fuel is injected into air passages 504, i.e., swirlers 503 are upstream of the location of fuel circuit 510 identified in FIG. 11. Swirlers 503 add centrifugal force to the air in each air passage 504, which concentrates the momentum of air towards the outside wall of the air passage 504. This encourages the fuel to distribute around the circumference of each air passage 504 as well as adding an additional radial component to the air/fuel mixture issuing from the atomizing circuit. Swirlers 503 are axial swirlers. FIG. 12 shows a fuel passage 604, schematically shown as a solid rather than a hollow structure, having a radial swirler 603. Any other suitable type of swirling air device can be used.

Figure 13:
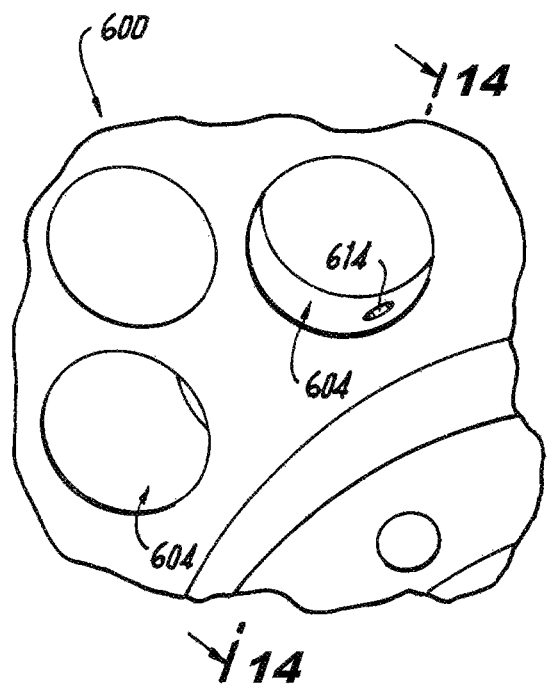
FIG. 13 is a perspective view of a portion of an exemplary embodiment of an atomizer, showing a tangential, direct cross-flow jet for fuel injection.
Figure 14:
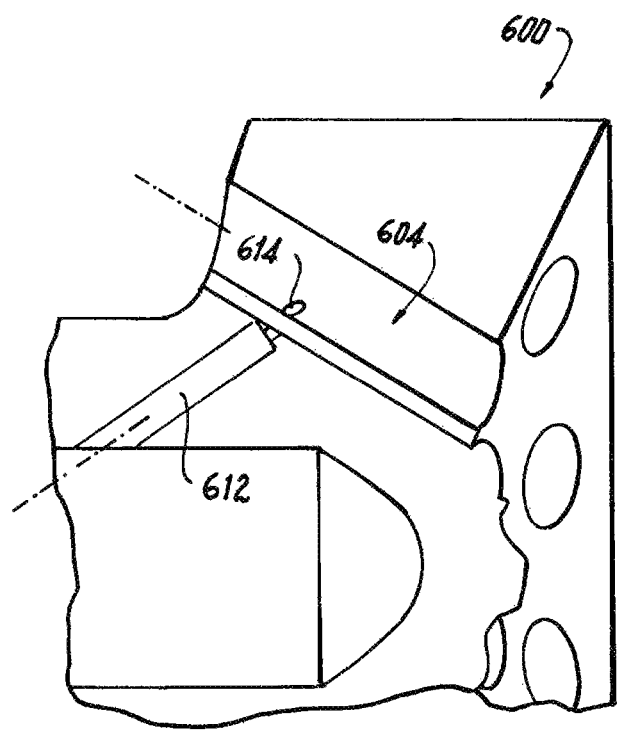
FIG. 14 is a cross-sectional side elevation view of a portion of the atomizer of FIG. 13, showing the oblique orientation of the fuel passage and air passage.
Figure 15:
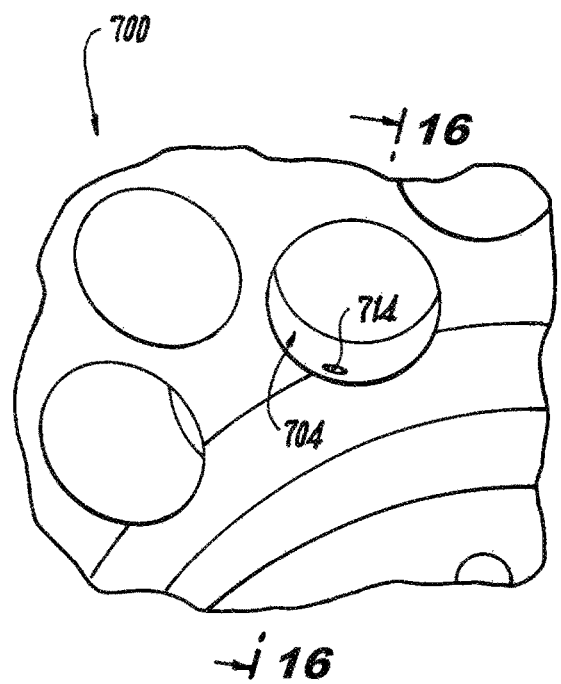
FIG. 15 is a perspective view of a portion of an exemplary embodiment of an atomizer, showing a non-tangential, direct cross-flow jet for fuel injection.
Figure 16:
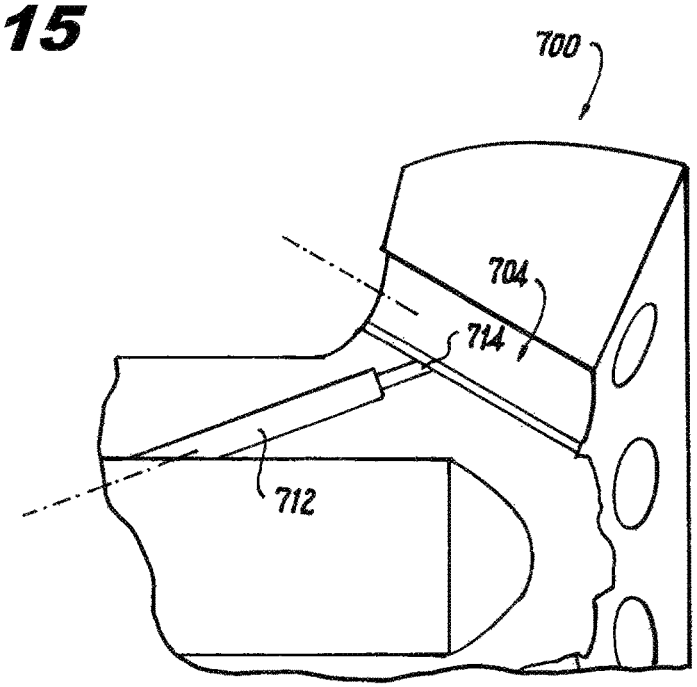
FIG. 16 is a cross-sectional side elevation view of a portion of the atomizer of FIG. 15, showing the oblique orientation of the fuel passage and air passage.

Referring now to FIG. 13, it is also contemplated that an atomizer 600 in accordance with this disclosure can include a direct, cross-flow injection jet or port 614, without the volute opening described above. FIG. 14 shows that the fuel passage 612 leading to port 614 is angled obliquely relative to the angle of the air passage 604, as indicated by the dashed axis lines. Moreover, fuel passage 612 and port 614 open into air passage 604 with a tangential component to induce a tangential component of fuel flow in air passage 604. FIGS. 15 and 16 show similar views to those of FIGS. 13 and 14, but of another exemplary atomizer 700 in which the fuel passage 712 and port 714 open into air passage 704 without a tangential component, i.e., the injection direction is directed along the central diameter plane of air passage 704, but there is an axially oblique component to the injection direction as indicated by the dashed axis lines in FIG. 16. It is also contemplated that the injection direction could be in a directly radial direction relative to the air passage, or in any other suitable direction for any given application.

While shown and described herein in the exemplary context of mixing liquid fuel with air, those skilled in the art will readily appreciate that atomizers as described herein can instead or additionally be used to mix gaseous fuel and air. It is contemplated that the atomizer components described herein can be formed using additive manufacturing techniques. However, any other suitable manufacturing techniques can be used without departing from the scope of this disclosure.

The methods and systems of the present disclosure, as described above and shown in the drawings, provide for atomizers with superior properties including improved atomization compared to traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An atomizer comprising:
an atomizer body with an air passage defined therethrough from an upstream end of the atomizer body to a downstream end thereof; and
a fuel circuit defined in the atomizer body extending from a fuel inlet to a fuel outlet opening into the air passage, wherein the fuel circuit includes a swirl channel extending circumferentially around the air passage, wherein the swirl channel has a greater cross-sectional depth relative to a flow path defined through the air passage than that of the air passage upstream and downstream of the swirl channel.

2. An atomizer as recited in claim 1, wherein the fuel circuit opens tangentially into the air passage relative to a flow path defined through the air passage.

3. An atomizer as recited in claim 1, wherein a fuel slot opens tangentially into the swirl channel.

4. An atomizer as recited in claim 1, wherein the air passage has an inlet portion upstream of where the fuel circuit opens into the air passage, and an outlet portion downstream of where the fuel circuit opens into the air passage, wherein the inlet portion has a smaller cross-sectional flow area than that of the outlet portion.

5. An atomizer as recited in claim 1, wherein the air passage has a cross-sectional shape including circular, trapezoidal, or elliptical, wherein the swirl channel has a shape conforming to the cross-sectional shape of the air passage.

6. An atomizer as recited in claim 1, wherein the air passage has an inlet portion extending in a first direction and an outlet portion extending in a second direction angled relative to the first direction for imparting a flow with at least one of a tangential, converging, or diverging component relative to a central axis defined by the atomizer body.

7. An atomizer as recited in claim 1, wherein the atomizer body includes at least one of:
an outer air swirler defined outboard of and surrounding the air passage and fuel circuit, and
an inner air swirler defined inboard of the air passage and fuel circuit.

8. At atomizer as recited in claim 1, wherein the air passage is defined between a pair of axial swirl vanes, and wherein the fuel circuit includes a fuel manifold outboard or inboard of the swirl vanes, with a respective fuel outlet opening along at least one of the vanes radially from the fuel manifold.

9. An atomizer as recited in claim 1, further comprising an air swirler mounted in the air passage to impart swirl within the air passage.

10. An atomizer comprising:
an atomizer body with a plurality of air passages defined therethrough from an upstream end of the atomizer body to a downstream end thereof, wherein the air passages together define an air circuit through the atomizer body; and
a fuel circuit defined in the atomizer body extending from a fuel inlet to a respective fuel outlet opening into each of the air passages respectively, wherein the fuel circuit includes a swirl channel extending circumferentially around the air passage, wherein the swirl channel has a greater cross-sectional depth relative to a flow path defined through the air passage than that of the air passage upstream and downstream of the swirl channel.

11. An atomizer as recited in claim 10, wherein the air passages are arranged circumferentially about a central axis defined by the atomizer body.

12. An atomizer as recited in claim 10, wherein the fuel circuit includes a manifold extending circumferentially about the atomizer body in fluid communication with a fuel opening in each respective air passage.

13. An atomizer as recited in claim 10, further comprising an outer air swirler defined through the atomizer body outboard of and surrounding the air passages and fuel circuit.

14. An atomizer as recited in claim 10, further comprising an inner air swirler defined through the atomizer body inboard of and surrounded by the air passages and fuel circuit.

* * * * *